United States Patent [19]

Lester

[11] Patent Number: 4,670,062
[45] Date of Patent: Jun. 2, 1987

[54] BRAKE DRUM CLEANER

[76] Inventor: James E. Lester, 567 Bernardo, Morro Bay, Calif. 93442

[21] Appl. No.: 773,798

[22] Filed: Sep. 9, 1985

[51] Int. Cl.⁴ .............................................. A47L 5/14
[52] U.S. Cl. ...................................... 134/21; 15/322; 15/345
[58] Field of Search ................ 15/321, 322, 345, 346; 134/21

[56] References Cited

U.S. PATENT DOCUMENTS

| 2,270,579 | 1/1942 | Chamberlin et al. | 15/346 X |
| 3,222,707 | 12/1965 | Allenbaugh | 15/345 |
| 3,328,827 | 7/1967 | Lake et al. | 15/345 X |
| 3,731,340 | 5/1973 | Pitre | 15/345 |
| 4,205,412 | 6/1980 | Weber | 15/345 X |

FOREIGN PATENT DOCUMENTS

| 2408072 | 8/1975 | Fed. Rep. of Germany | 15/345 |
| 2346061 | 10/1977 | France | 15/345 |

Primary Examiner—Chris K. Moore
Attorney, Agent, or Firm—Daniel C. McKown

[57] ABSTRACT

An apparatus for cleaning brake drums includes an inflatable toroidal seal for establishing a dust-tight seal between the brake assembly and the apparatus, an air jet for causing asbestos particles to become airborne, an exhaust fan or turbine driven by an air motor for vacuuming the airborne asbestos particles into a filter bag, an internal atomizer for producing a mist of liquid within the apparatus to settle any residual asbestors particles, and a set of pushbuttons arranged in the order in which they would normally be used for controlling the various modes of operation of the apparatus. The apparatus may also be used for cleaning clutches.

8 Claims, 2 Drawing Figures

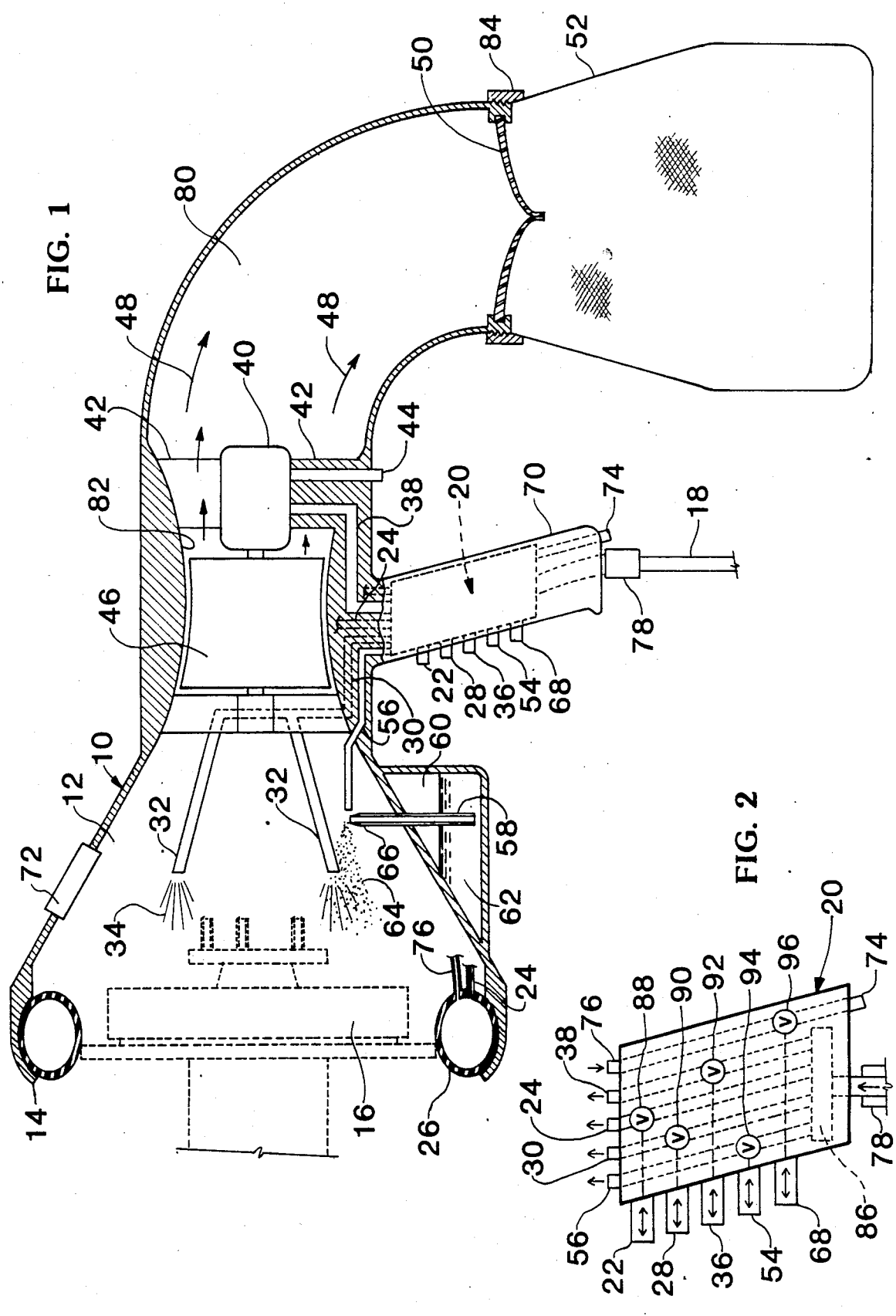

BRAKE DRUM CLEANER

BACKGROUND OF THE INVENTION

1. Field of the Invention

The present invention is in the field of cleaning machines and more specifically relates to a machine that employs both an air blast and a vacuum to clean asbestos particles from the brake drum of an automobile.

1. The Prior Art

It is now widely recongized that it is hazardous to a person's health to inhale particles of asbestos. Nevertheless, at this time, many automobile brake linings are made from compositions that include asbestos. As the brakes are used, the brake lining material is worn to dust, and some of this dust remains trapped in the brake drum and associated parts.

Before the hazard was understood, automobile repairmen normally used a blast of compressed air to blow the asbestos dust particles out of the brake assembly. When this was done, the particles were dispersed throughout the workplace with the result that the workers breathed appreciable quantities of asbestos dust, and later became ill.

A number of inventors have addressed the problem of how to remove the asbestos particles from the brake assembly without at the same time dispersing those particles throughout the air of the workplace.

These inventors have, almost without exception, included as part of their inventions a hood within which an air nozzle directs a stream of air at the brake, and the resulting cloud of particles is contained by the hood. Possibly the earliest patent is U.S. Pat. No. 3, 222,707 issued Dec. 14, 1965 to Allenbaugh. Allenbaugh is notable for his use of a venturi jet for obtaining a vacuum to dispose of the cloud of suspended particles.

Other known prior art includes U.S. Pat. Nos. 3,510,905 issued May 12, 1970 to Bannert; 3,731,340 issued May 8, 1973 to Pitre, Sr.; 3,972,089 issued Aug. 3, 1976 to Parks; 3,978,547 issued Sept. 7, 1976 to Lawson; and 4,205,412 issued June 3, 1980 to Weber. By the time of Weber's patent, the health hazardous aspects of asbestos dust had become widely recognized, and the Weber patent is noteworthy in disclosing a system in which all of the incoming air is washed by a water spray before being discharged into the atmosphere.

Other prior art includes French published application No. 2,346,061 published Oct. 28, 1977 by Aspirateurs Nilfisk, S.A. and West German published application DE No. 29 36 779 A1 of Fischer, published Apr. 1981.

The design of the present invention includes several features which do not appear to be known in the prior art, and which permit superior performance to be obtained.

SUMMARY OF THE INVENTION

It is an object of the present invention to provide a brake drum cleaner that automatically forms a dust-tight seal to brake shoes of various sizes.

It is a further object of the present invention to provide a brake drum cleaner that includes a powerful vacuum mechanism for drawing airborne dust into a filter bag.

It is a further objective to provide a brake drum cleaning apparatus in which any dust remaining suspended in the air within the hood is removed prior to removal of the hood from the brake drum.

It is a further objective of the present invention to provide convenient and efficient means by which the operator can control the operation of the apparatus.

It is a further object of the invention to provide a new method of removing the dust from a brake drum and safely disposing of the dust.

These objectives are believed to be satisfied by the provision within the apparatus of the present invention of novel structures and procedures that, taken together, constitute a brake drum cleaner of superior performance.

In accordance with the present invention, the front end of the hood, which engages the brake drum or the backing plate, is provided with an inflatable toroidal seal. Because the toroidal seal is surrounded by the rigid front end of the hood, it cannot expand outwardly, but when air is applied to the seal, it expands inwardly to make a dust-tight sealing contact with the brake drum or backing plate. This feature permits the brake drum cleaner to be used without adjustment on brake drums of various sizes.

A second advantageous feature of the invention is an air turbine or air motor that is used to drive a turbine that is used for drawing the suspended dust particles from the hood into a collecting filter bag.

Yet another feature of the present invention is the provision of a water spray or mist within the hood for washing the air within the hood prior to removal of the apparatus from the brake drum. In this way, no residual dust within the hood is released into the atmosphere.

Another feature of the present invention is the provision of a set of control buttons or plungers that the user can manipulate in sequence to program the occurrence of the various modes of operation of which the brake drum cleaner of the present invention is capable. This gives the operator greater control and allows him to adapt the duration of the various steps to the circumstances.

Another noteworthy feature of the present invention is that its normal cycle of operation consists of the following steps. First, the inflatable toriodal seal is inflated to engage the front end of the hood to the brake drum being cleaned. Next, a strong blast of compressed air within the hood sweeps up practically all of the dust that has been clinging to the parts of the brake and causes that dust to be suspended in the air within the hood. Thereafter, the apparatus is put into the vacuum mode in which the suspended particles are drawn from within the hood to a filter bag, where they are captured and retained. Thereafter, a water mist is produced within the hood to settle any dust that may remain suspended therein and to moisten the brake parts and the interior of the hood to prevent any residual particles from become airborne. Finally, the toroidal seal is deflated, and the apparatus is disengage from the brake drum.

This sequence of operation is entirely under the control of the operator, and he can repeat the procedure or prolong various steps at his discretion.

In a preferred embodiment, there is provided a number of plungers or push buttons which the operator can manipulate to terminate one stage of the operation and to initiate the next stage. In an alternative embodiment, a single control lever is provided, and the various stages are initiated by pushing that lever from one position to another.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a diagram showing a side cross-sectional view of a preferred embodiment of the brake drum cleaner of the present invention; and, FIG. 2 is a diagram showing a valve of the type used in the preferred embodiment of the invention.

DETAILED DESCRIPTION OF THE PREFERRED EMBODIMENT

Turning now to the drawings, in which a preferred embodiment of the invention is shown in diagrammetric form, it is seen that the cleaner consists of a number of parts that are mounted inside the housing 10. The housing 10 defines a generally conical space 12, and terminates at a rim 14 that defines an aperture. The brake assembly 16 extends through the aperture and into the space 12 when the cleaner is in use.

The housing 10 further includes a handle 70 which contains a distribution valve 20. A high pressure air line 18 is connected by means of a fitting 78 to the valve 20. The valve 20 is a distribution valve in which the high pressure air supplied by the line 18 is distributed under control of the operator to one or more of the conduits 56, 30, 24, 38. The operator implements his selection by pushing one or more of the pushbuttons 22, 28, 36, and 54. The pushbutton 68, when depressed, opens the relief conduit 76 to the atmosphere through the exhaust port 74. The air in the line 18 is typically pressurized to a pressure of 100 to 150 psig.

Mounted within the rim 14 is an inflatable toroidal seal 26. This seal is composed of a resilient material, such as rubber, and generally resembles an innertube for a bicycle tire. The purpose of the inflatable toroidal seal 26 is to permit the cleaner to be used on brake assembles of various sizes and shapes. The diameter of the rim 14 is greater than that of any brake assembly with which the cleaner might be used. The inflatable toroidal seal 26 cannot expand outwardly because of the presence of the rim 14, and therefore, when the inflatable toroidal seal 26 is inflated, it expands inwardly to occupy the space between the brake assembly and the rim 14, thereby sealingly engaging the brake assembly and preventing asbestos dust from escaping through the aperture.

Inflation of the inflatable toroidal seal 26 is controlled by the first pushbutton 22 on the valve 20. When the pushbutton 22 is depressed, high pressure air is permitted to flow from the supply line 18 to the conduit 24 to inflate the seal 26. When the pushbutton 22 is released, the valve 20 does not permit the air within the seal 26 to escape.

When it is desired to let the air out of the seal 26, the operator depresses the pushbutton 68, and the air flows out of the seal 26 through the conduit 76 that is connected to the valve 20, which connects the conduit 76 to the exhaust port 74 when the pushbutton 68 is depressed.

When the operator depresses the second pushbutton 28, the high pressure air is applied to the conduit 30 that leads to the air nozzles 32. The air nozzles 32 produce a jet 34 of air that is directed at the brake assembly for the purpose of dislodging the asbestos particles from the brake assembly. Although only two air nozzles 32 are shown in the diagram of FIG. 1, several stiff but bendable nozzles are used in the preferred embodiment. It is recognized that when the high pressure air is released into the space 12 through the nozzles 32, some overpressure is likely to be developed within the space 12. To prevent this overpressure from reaching an undesirable magnitude, the housing 10 is provided with a filter 72 through which air can escape through the housing, but in which the asbestos particles will be trapped.

Immediately following the blast of air through the nozzles 32, the asbestos particles will be airborne within the space 12. It is desired to remove the particles from that space and to deposit them into the filter bag 52. To that end, it is provided that when the operator depresses the third pushbutton 36, the high pressure air from the supply line 18 will be applied through the conduit 38 to an air motor or turbine 40 for the purpose of driving a fan 46. The fan 46 produces a flow of air out of the space 12 and into the space 80. The air that has been used for driving the air motor 40 is exhausted through the exhaust air conduit 44, and is discharged into the atmosphere. The air motor 40 is supported within the housing 10 by the brackets 42 so as not to impede the flow of air to the filter bag 52. In another embodiment, the exhaust air is discharged into the space 12, where it serves as makeup air to replace the air that is drawn through the fan 46.

The action of the fan 46 is to drive the air into the space 80 as indicated by the arrows 48. To facilitate the flow of air, the inner wall 82 of the housing is arched inwardly to form a venturi in which the fan 46 is located.

The fan 46 creates a slight overpressure in the space 80, which opens the check valve 50 permitting the air to flow into the filter bag 52. The filter bag 52 is permeable to the air, but is constructed of a filter material that prevents the asbestos particles from passing through. In the preferred embodiment, the circumference of the end of the housing closest to the filter bag 52 is threaded to receive a threaded ring 84 to which the filter bag 52 is joined. This permits the filter bag 52 to be removed for replacement or emptying.

It is conceivable that a small amount of asbestos dust may still remain in the space 12, either in the air, on the brake assembly 16, or on the inside of the housing. It is desirable that this dust be settled before the cleaner is removed from the brake assembly. To this end, the housing is provided with a liquid reservoir 60 which contains a liquid 62 and a tube 58 that extends downwardly to within a small distance from the bottom of the liquid reservoir and whose upper end serves as a nozzle 66.

A mist 64 of the liquid 62 is formed by pushing the fourth pushbutton 54, which applies high pressure air from the supply line 18 to the conduit 56. The nozzle 66 is positioned at the end of the conduit 56, so that as the air flows out of the conduit 56, it flows across the nozzle 66, lowering the local air pressure, which causes the liquid 62 to rise in the tube 58 and to be blown out of the nozzle 66 in the form of mist 64. In other embodiments, the provision of the mist-producing apparatus is optional.

Upon completion of the misting operation, the operator releases the fourth pushbutton 54 and depresses the fifth pushbutton 68 which allows the pressurized air within the inflatable toroidal seal 26 to flow from the conduit 76, through the vavle 20 and out the exhaust port 74. This releases the sealing engagement of the cleaner to the brake assembly 16.

Thus, it is seen that the operation of the cleaner is programmed under control of the operator by pressing the buttons 22, 28, 36, 54, and 68 in succession.

In the best mode of practicing the invention, the operations are performed in the following sequence. First, the inflatable toroidal seal 26 is inflated to assure a dust-tight seal with the brake assembly 16. Thereafter, the air nozzles 32 are used to direct a blast of air against the brake assembly, and the fan 46, driven by the air motor 40 is used to draw the particle-laden air from the space 12 and to drive that air through the space 80 and into the filter bag 52. Thereafter, the brake assembly 16 is sprayed with a mist of liquid to settle any residual dust. Finally, the inflatable toroidal seal 26 is deflated and the cleaner is removed from the brake assembly. The sequence of these operations is suggested to the operator by the linear arrangement of the pushbuttons 22, 28, 36, 54, and 68.

FIG. 2 shows the valve 20 in greater detail. The incoming air flows into a manifold 86 from which the conduits 56, 30, 24, 38, and 76 emerge. Each of the pushbuttons 22, 28, 36, 54 and 68 is mechanically connected to control one of the valves 88, 90, 92, 94, and 96, respectively. The arrows on the pushbuttons indicate motion.

Thus, there has been described a brake drum cleaner that is relatively small and portable, and that includes a built-in vacuum cleaner for driving the asbestos particles into a filter bag. The vacuum cleaner is operated by high pressure air, which supplies the motive force for the apparatus. The brake drum cleaner of the present invention employs a unique inflatable toroidal seal for establishing a dust-tight seal with the brake assembly, and is further distinguished by the provision of an atomizer for producing a spray of liquid within the housing of the cleaner.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. An apparatus for cleaning particles from a brake assembly, comprising in combination:
    a housing enclosing a space and having a rim defining an aperture through which the brake assembly extends into the space for cleaning;
    nozzle means mounted to said housing and extending into the space enclosed by said housing for directing a jet of air at the brake assembly to cause the particles to become airborne; and,
    sealing means mounted on the rim, extending around the aperture, and expanding into the aperture when inflated for making sealing contact with the brake assembly.

2. The apparatus of claim 1 wherein said sealing means is composed of a resilient material.

3. The apparatus of claim 1 further comprising in combination: control means connected to said sealing means for selectively supplying air to said sealing means under control of an operator and for selectively releasing air from said sealing means under control of an operator.

4. An apparatus for cleaning particles from a brake assembly, comprising in combination:
    a housing enclosing a space into which the brake assembly intrudes;
    air nozzle means mounted to said housing and extending into the space enclosed by said housing for directing a jet of air at the brake assembly to cause the particles to become airborne; and,
    liquid nozzle means mounted to said housing and extending into the space enclosed by said housing for spraying a mist of liquid into the air within the space.

5. The apparatus of claim 4 further comprising in combination: liquid control means connected to said liquid nozzle means for selectively controlling the spraying of the mist under control of an operator.

6. The apparatus of claim 4 further comprising in combination: a liquid supply tank mounted on said housing and connected to said liquid nozzle means for supplying liquid to it.

7. A method of cleaning particles from a brake assembly by using an apparatus that has a housing that encloses a space and into which space the part of the brake assembly to be cleaned is introduced, the housing having an inflatable sealing means that encircles the brake assembly and when inflated sealingly engages the brake assembly, the apparatus also including a collecting filter through which particle-laden air is driven and in which the particles are deposited, said method comprising the steps of:
    positioning the housing so that the part of the brake assembly to be cleaned extends into the space within the housing;
    inflating the inflatable sealing means to achieve a dust-tight seal between the housing and the brake assembly;
    directing a jet of air at the part of the brake assembly that extends into the space within the housing to cause the particles to become airborne;
    drawing air in which the particles are suspended from the space within the housing and driving that air into the collecting filter;
    directing a spray of liquid into the space within the housing; and,
    deflating the inflatable sealing means, whereby the apparatus is released from the brake assembly.

8. Apparatus for cleaning asbestos particles from a brake assembly, comprising in combination:
    a housing enclosing a space into which the brake assembly intrudes;
    first means attached to said housing for establishing a dust-tight seal between said housing and the brake assembly;
    second means mounted within said housing for blasting the brake assembly with a jet of air to cause the asbestos particles to become airborne within said housing;
    third means mounted to said housing for drawing the airborne asbestos particles into a filter bag;
    fourth means mounted within said housing for spraying the brake assembly and the interior of the housing with a mist of liquid;
    fifth means mounted to said housing for disengaging the apparatus from the brake assembly; and,
    control means mounted to said housing and including a first actuator, a second actuator, a third actuator, a fourth actuator, and a fifth actuator for use by an operator, respectively, in selectively controlling the operation of said first means, seond means, third means, fourth means, and fifth means, said actuators being arranged in the same sequence as the sequence in which the operations they control are to be performed, whereby the proper sequence for operating said first through fifth means is is suggested to the operator by the arrangement of the actuators.

* * * * *